United States Patent
Gupta et al.

(10) Patent No.: US 8,775,614 B2
(45) Date of Patent: Jul. 8, 2014

(54) MONITORING REMOTE ACCESS TO AN ENTERPRISE NETWORK

(75) Inventors: Dhiraj K. Gupta, Hyderabad (IN); Gerardo Diaz-Cuellar, Kirkland, WA (US); Ashish Saxena, Hyderabad (IN); Abhishek Tiwari, Hyberabad (IN)

(73) Assignee: Microsoft Corporation, Redmond, WA (US)

( * ) Notice: Subject to any disclaimer, the term of this patent is extended or adjusted under 35 U.S.C. 154(b) by 294 days.

(21) Appl. No.: 13/299,975

(22) Filed: Nov. 18, 2011

(65) Prior Publication Data

US 2013/0067072 A1    Mar. 14, 2013

Related U.S. Application Data

(60) Provisional application No. 61/533,780, filed on Sep. 12, 2011.

(51) Int. Cl.
  *G06F 15/173*    (2006.01)

(52) U.S. Cl.
  USPC ........... 709/224; 709/223; 709/225; 709/227; 709/229

(58) Field of Classification Search
  USPC .......................... 709/223, 224, 225, 227, 229
  See application file for complete search history.

(56) References Cited

U.S. PATENT DOCUMENTS

| | | | |
|---|---|---|---|
| 7,107,464 B2 | 9/2006 | Shapira | |
| 7,386,881 B2 | 6/2008 | Swander | |
| 7,624,263 B1 | 11/2009 | Viswanath | |
| 7,725,707 B2 | 5/2010 | Yamada | |
| 2005/0283604 A1 | 12/2005 | Deshpande | |
| 2006/0036525 A1* | 2/2006 | Ramos et al. | 705/35 |
| 2006/0227770 A1 | 10/2006 | Jakubik | |
| 2007/0061871 A1* | 3/2007 | Simpkins et al. | 726/4 |
| 2007/0271606 A1 | 11/2007 | Amann | |
| 2009/0177587 A1* | 7/2009 | Siegal et al. | 705/67 |
| 2009/0177784 A1 | 7/2009 | Olson | |
| 2011/0202269 A1* | 8/2011 | Reventlow | 701/201 |
| 2012/0030773 A1* | 2/2012 | Schwesig | 726/28 |

OTHER PUBLICATIONS

Guo, C. et al. "End-system based Mobility Support in IPv6", IEEE Journal on Selected Areas in Communications, vol. 23, No. 11, Nov. 2005; pp. 2104-2117; http://ieeexplore.ieee.org/xpl/freeabs_all.jsp?arnumber=1525161.

* cited by examiner

*Primary Examiner* — Liangche A Wang
(74) *Attorney, Agent, or Firm* — Nicholas Chen; Kate Drakos; Micky Minhas

(57) ABSTRACT

Techniques to provide an improved representation of remote network access for a network administrator managing and controlling access to resources on an enterprise network. The representation indicates resources accessed by a remote computer or by a user of that computer and provides associated information useful for managing remote network access. To create the representation, multiple security associations formed between a remote client computer and resources on the enterprise network are associated with entity sessions, based on identical session identifiers generated for each security association within an entity session. The entity sessions may be aggregated into a to DirectAccess "connection" between the remote client computer and the enterprise network, based on an identity of the remote client computer. Resources accessed over the connection may be identified using a session identifier of each entity session so that security associations in that entity session may be matched with the resources.

20 Claims, 9 Drawing Sheets

Detailed client statistics

Detailed client statistics show all information for a specific connection.

| Property | Value |
|---|---|
| User name | dAMKU-TH1-DC\Administrator |
| Host name | dAMKU-TH1-DC\AMKU-TH1-CLI$ |
| ISP address | 2.1.1.100 |
| Protocol/Tunnel | Teredo |
| Duration | 3:17:59 |
| Activity status | Idle |
| Rate | 0 bps |
| IPv4 address | 2.1.1.100 |
| IPv6 address | 2001:0:201:101:30ee:1fce:fdfe:fe9b |
| Access status | User mode/Full access |
| Type | DirectAccess |
| Server | AMKU-TH1-DAS.dAMKU-TH1-DC.com |
| Total bytes in | 1288 |
| Total bytes out | 3664 |
| Total bytes | 4952 |
| Connection start time | 8/24/2011 10:20:33 PM |
| Status | - |
| Authentication method | Machine Kerberos & User Kerberos |

Learn More...

Close

FIG. 7

```
PS E:\Scripts> Get-RemoteAccessConnectionStatistics|select-object -property *

ClientIPv4Address      : 2.1.1.100
ClientIPv6Address      : 2001:0:201:101:30ee:1fce:fdfe:fe9b
ClientExternalAddress  : 2.1.1.100
AccessStatus           : User Mode/Full Corp Access
AuthMethod             : Machine Kerberos & User Kerberos
ConnectionDuration     : 11727
ConnectionStartTime    : 8/24/2011 10:20:33 PM
ConnectionType         : DirectAccess
HealthStatus           : -
HostName               : dAMKU-TH1-DC\AMKU-TH1-CLI$
TotalBytesIn           : 1288
TotalBytesOut          : 3664
TransitionTechnology   : Teredo
TunnelType             : Esp
Bandwidth              : 0
UserActivityState      : Idle
UserName               : {dAMKU-TH1-DC\Administrator}
```

FIG. 8

MONITORING REMOTE ACCESS TO AN ENTERPRISE NETWORK

CROSS-REFERENCE TO RELATED APPLICATION

This application claims priority under 35 U.S.C. §119(e) to U.S. provisional patent application Ser. No. 61/533,780, entitled "Monitoring Remote Access to an Enterprise Network," filed on Sep. 12, 2011, the entirety of which is incorporated herein by reference.

BACKGROUND

The advent of the Internet dramatically facilitated exchange of data among computers. The Internet also provided unprecedented opportunities for telecommuting and mobile computing. Many companies, corporations, businesses and organizations allow remote access to their enterprise networks so that remote users can access resources on the networks. The enterprise network may be a secure corporate network or any other private network access to which is controlled by the enterprise.

Increasing access to information on the enterprise network raises an issue of ensuring security of the information. Different technologies exist to provide secure access to an enterprise network. For most private networks, some form of authentication is required before a remote client is allowed to access resources on the network. A remote entity, such as a remote client computer or a user having an account on a corporate network, which attempts to access resources on the network, typically provides authentication information.

A number of different mechanisms are used for secure access to resources on an enterprise network. DirectAcess is a remote access technology developed by Microsoft® Corporation that allows remote users to connect to an enterprise network when they have Internet access, without initiating a virtual private networking (VPN) connection. Unlike VPN, DirectAcess may automatically establish a bi-directional connection from a remote client computer to a corporate network. This allows the remote user to access internal network resources through an environment that provides the same user experience as the user would have in the office.

DirectAccess may use secure access mechanisms provided by network communication protocols such as, for example, Internet Protocol security (IPsec) over Internet Protocol version 6 (IPv6), to encrypt communications over the Internet.

A connection between a remote client, which may be a domain member of a corporate network, and the corporate network using DirectAccess may be established as a secure connection over one or more IPsec tunnels. The IPsec tunnels may be established between the remote client and a gateway server, referred to as a DirectAccess server, providing access to the corporate network. In this "end-to-edge" model of DirectAccess, once the remote client establishes one or more IPsec tunnels to the DirectAccess server, that server may then forward unprotected traffic to the corporate resources. In another model of implementing DirectAccess, which is referred to as an "end-to-end" model, the remote client may establish an IPsec session with each resource on the corporate network to which the client connects. In this way, communications between the remote client and a corporate resource may be protected while traversing both the Internet and the corporate network. Other models of DirectAccess may be implemented as well, including combinations of the above "end-to-edge" and "end-to-end" models.

To track, monitor and control clients accessing resources on an enterprise network over a remote network access connection, a network administrator may utilize information obtained in conjunction with such accesses. When a remote client computer connects to an enterprise network using DirectAccess, multiple security associations may be formed for interactions between the client computer and resources on the enterprise network. Multiple security associations may complicate monitoring remote network access.

SUMMARY

To improve experience of a user, such as a network administrator, monitoring and controlling remote access to resources on an enterprise network, techniques are provided for presenting remote access information to the administrator in a way that indicates which resources are accessed by which remote entity, such as a remote client computer or a user of that computer, via a secure remote network connection over the Internet.

In some embodiments, the secure remote connection may be established in accordance with DirectAccess or other remote network access technology. DirectAccess employs IPsec for data encryption and authentication. Thus, an IPsec connection may be established between a remote client computer and a resource on the enterprise network, and a security association may be created for this IPsec connection, in accordance with an access policy specified for that resource. In this way, multiple security associations may be created when resources on an enterprise network, such as a corporate network, are accessed by a remote entity through a remote client computer over DirectAccess.

An aggregation of multiple security associations created for the same remote client computer connecting to resources on the corporate network using a remote network access technology may be referred to as a "connection." To provide a single view of such connection, each security association may be associated with a group referred to as an "entity session" created for an entity, such as a remote computer or a user of the remote computer, that accesses corporate resources through the remote client computer. One or more entity sessions for entities accessing resources on the corporate network through the same remote client computer may be associated with the connection.

To aggregate multiple security associations into an entity session, a session identifier may be generated for each security association so that identical session identifiers are generated for security associations that belong to the same entity session. The session identifier may be generated based on suitable parameters of the security association.

Further, one or more entity sessions may be grouped into a "connection" that may encompass security associations created for a remote client computer so that one or more entities may access corporate resources through this remote client computer using a remote network access connection. The connection may be established using DirectAccess. The entity sessions may be associated with a connection based on an identity (e.g., an IP address) of the remote client computer.

The session identifier generated for a security association to associate the security association with an entity session may be used to indicate which corporate resources are accessed over the connection comprising that entity session. Accordingly, the described techniques may enable the administrator to view resources on the enterprise network that are accessed by one or more entity from a remote client computer over DirectAccess. This may allow a more granular control over remote network access and may improve network management capabilities of the administrator. Information on the connection and associated resources may be presented to the administrator in any suitable form, such as, for example, displayed on a user interface.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 7 is a snapshot of a user interface displaying information about a connection, according to one embodiment of the invention;

FIG. 8 is another snapshot of a user interface displaying information about a connection, according to one embodiment of the invention.

DETAILED DESCRIPTION

Figure 1:
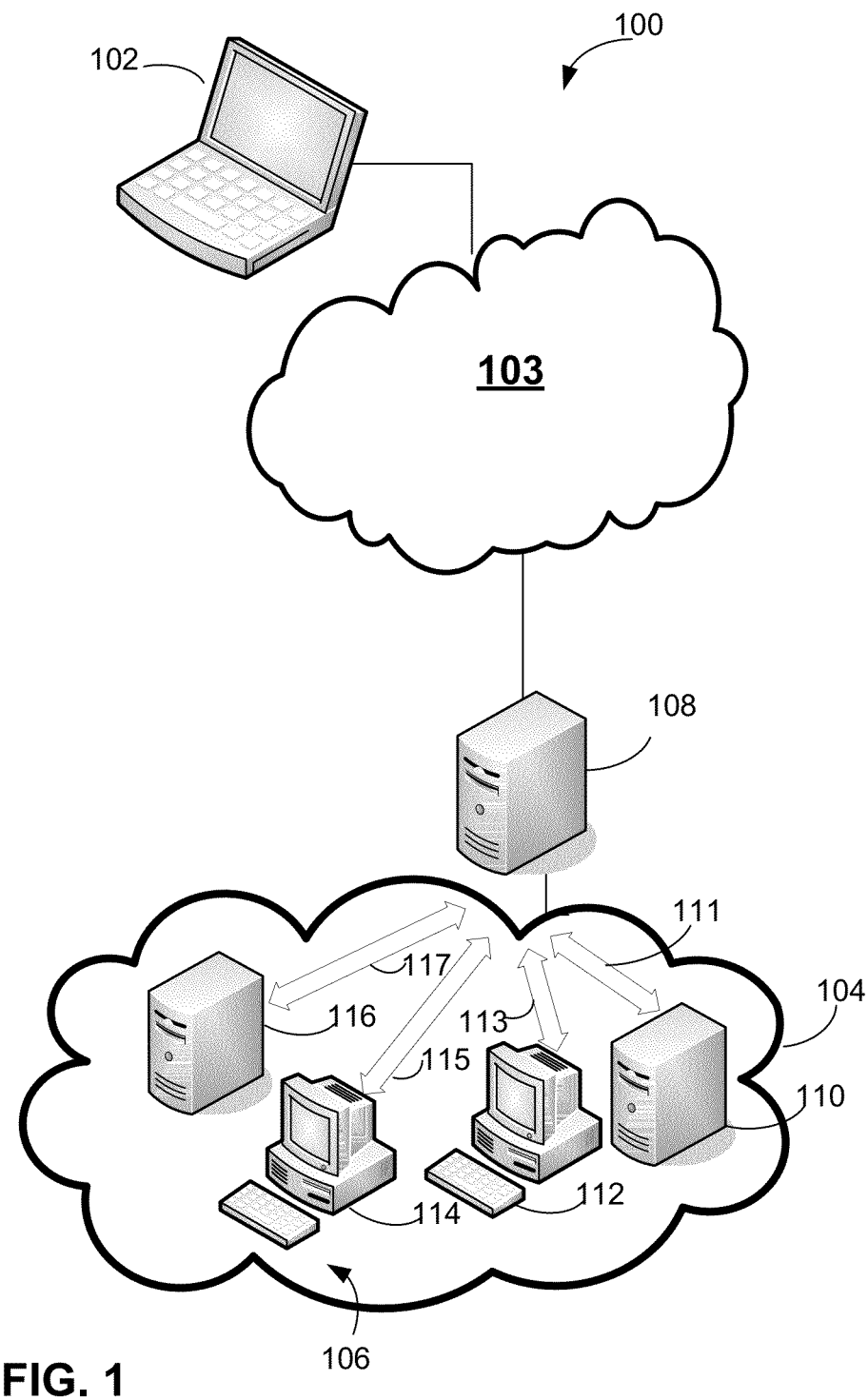
FIG. 1 is a sketch of an exemplary network environment in which a remote client computer may access a corporate network via DirectAccess.

The inventors have recognized and appreciated that experience of a user, such as a network administrator, monitoring and controlling remote access to an enterprise network may be improved by providing a representation of remote network access that indicates which remote entities are accessing which corporate resources via a secure connection, such as a connection established using DirectAccess. The representation may allow the network administrator to apply granular control over remote access to the resources while being able to view, manage and analyze remote network access to resources accessed from the same remote client computer.

Techniques are provided that allow creating a representation comprising a single view of a "connection." For purposes of this description, a "connection" may be taken to comprise security associations created for resources on the enterprise network that are accessed through the same remote client computer connected to the enterprise network over a secure connection via the Internet. For example, the connection over DirectAccess may comprise one or more IPsec connections established between the remote client computer and one or more resources on the enterprise network. The representation of the connection may be provided in any suitable manner, such as displayed on a user interface. The network administrator may thus be enabled to manage in a more efficient manner resources accessed over the same connection.

A remote client computer accessing a corporate network may be a domain member of the network that has an account on the network. In this way, the computer may be treated as a "user" of the corporate network. DirectAccess may authenticate such remote client computer for remote access to the enterprise network once the remote client computer is connected to the Internet. This allows the remote client computer to connect to an enterprise network in a "computer mode," before a user logs on to the enterprise network through that computer. After the remote client computer is authenticated, a user of that computer, which may have a user account on the enterprise network, may authenticate with the network, in a "user mode." Once the user is authenticated, the remote client computer may connect to one or more resources on the corporate network and exchange data with the resources in a suitable manner.

DirectAccess uses IPsec for authentication and encryption. Different access policies (e.g., IPsec policies) may be specified for each resource on an enterprise network in a suitable manner. For example, a network administrator may set an access policy for a resource indicating authentication and encryption requirements that need to be met to interact with the resource. The access policy for the resource may specify whether to create an IPsec session between a remote client computer and the resource when it is accessed from outside the corporate network.

Before exchanging secure data, the remote client computer and a resource may negotiate a security agreement, called a security association. The security association may be formed by negotiating how the remote client computer and the resource will subsequently exchange and protect data. The security association may be created in accordance with any suitable remote access technology based on IPsec. For example, DirectAccess may rely on establishing IPsec sessions between a remote client computer and a resource.

In some embodiments where DirectAccess is used, a secure IPsec tunnel may be created between a remote client computer and a server controlling access to the corporate network, such as a DirectAccess server, when the remote client computer connects to the Internet. This IPsec tunnel may be created prior to user's logging on to the corporate network and may be used to authenticate the remote client computer. Any suitable information may be used for the authentication of the computer, such as its certificate or other suitable information. The remote client computer may access via this IPsec tunnel a suitable resource, such as a domain name server or a domain controller, on the enterprise network that may authenticate the computer. One or more security associations may be created for this tunnel.

In some scenarios, security associations may also be created for another IPsec tunnel that may be established after a user of the authenticated remote client computer is also authenticated using suitable user and computer authentication information. The user authentication information may comprise an ID and a password, a user certificate, a smart card or any other suitable authentication information.

In some embodiments, once the user of the remote client computer is authenticated so that it can access resources on the corporate network, a secure association may be created for one or more resources subsequently accessed through the remote client computer, in accordance with an access policy specified for these resources. For example, a security association may be created to connect to each resource having an access policy that requires a secure connection be established between a remote client computer and that resource. As an exemplary implementation of the secure connection, an IPsec session may be established via an IPsec tunnel between the remote client computer and the server. Data may be transferred from the server to the resource in an IPsec transport mode, as known in the art or developed in the future. Though, in some implementations, an IPsec session may be established in an IPsec tunnel mode from the remote client computer to the resource.

For each of the secure IPsec tunnels, "main mode" security associations may be created that establish the tunnels using computer authentication and credentials and "quick mode," "extended mode," or otherwise referred to security associations, which may include both computer and user authentication methods and protect data exchanged through the tunnels.

Further, it should be appreciated that a particular remote access technology is not a limitation on embodiments of the invention. Accordingly, even though an exemplary implementation of DirectAcess is described herein, any suitable implementation based on DirectAcess may be utilized. Moreover, any other suitable IPsec-based technology may be used to connect a remote access client to one or more resources on a corporate network.

Multiple security associations created when different remote client computers connect to resources on a corporate network may complicate determining which resources are accessed from the same remote client. This may be further complicated because security association(s) may be created when the remote client computer accesses a resource on the corporate network before a user logs on. After the user subsequently logs on to the corporate network through the authenticated remote computer, security association(s) may be created for accessing one or more resources by the user. Furthermore, another user may log on to the corporate network through the same computer, such as a user having a different account on the corporate network, and security associations may be created for this user to connect to corporate resources. Though, it should be appreciated that, in some scenarios, only a remote client device connects to a corporate network, without any user participation.

Regardless of a manner in which multiple security associations may be created to connect to resources on a corporate network, the described techniques allow associating the security associations into a single connection, which comprises security associations created for connecting to corporate network resources through a remote client computer, and providing this information to a network administrator so that the administrator can view resources accessed over the connection.

In some embodiments, the security associations may first be associated with what is referred to as an "entity session." An entity session may be an aggregation of security associations established for an entity that connects to one or more resources on a corporate network from a remote client computer. A security association for an IPsec connection between a remote client computer and a resource may comprise any suitable information required to encrypt packets, such as an IP address, a port number, an authentication method, an encryption method, security keys and any other addressing and keying information. A security association may be negotiated using any suitable technique as known in the art or developed in the future, as embodiments of the invention are not limited in this respect.

The entity may be a remote client that is a domain member of a corporate network and that may authenticate with the corporate network using any suitable computer credentials, without any input from a user. Accordingly, an entity session for a remote client computer may be referred to as a "computer session."

DirectAccess allows a remote client device to authenticate (e.g., via a DirectAccess server) before a user logs on and a session may comprise security associations formed between the remote client device and resources on the corporate network before the user authenticates to connect to the corporate network. Thus, in some scenarios, no user authentication may be conducted and each security association created for a remote client computer may be associated with a "computer session." A user authentication may not be required in scenarios in which a remote client computer connects to a corporate network for purposes of remote network management or for any other purposes that may not depend on user participation.

Furthermore, a "user/computer session" may be an aggregation of security associations established when a user of the remote client computer authenticates with the corporate network and connects to resources on the network. More than one user having a user account on the corporate network may connect to resources on the network through the same remote client computer. It should be appreciated that embodiments of the invention are not limited with respect to an entity for which an entity session may be formed in accordance with some embodiments.

In some embodiments, to aggregate one or more security associations into an entity session, an identifier may be generated for each security association so that security associations that belong to the same entity session have that identifier. This identifier may therefore be referred to as a "session identifier." The session identifier may be unique for each entity session.

The entity session may comprise security associations generated for an entity, such as a remote client computer or one or more users of that remote client computer. Each entity may use different authentication information to access a resources on the enterprise network. Thus, the session identifier may be generated for each security association associated with a "computer session" that comprises security associations established between a remote client computer and one or more resources on the corporate network. Once a user logs on to the corporate network through that remote client computer, security associations created when a user accesses one or more resources on the corporate network may be grouped into another entity session (e.g., a "user/computer session"). If one or more other users log on to the corporate network through the same remote client computer, further entity sessions may be formed from security associations created when the other users access resources on the corporate network.

The session identifier generated for a security association to associate it with an entity session may be generated using any suitable information and any suitable technique. For example, the session identifier may be generated using one or more parameters of the security association. The parameters of the security association created for an entity accessing a resource on an enterprise network through a remote client computer may comprise an IP address of the remote client computer, an authentication method used to authenticate the entity with the enterprise network and information used to authenticate the entity. The information used to authenticate a remote access client (i.e., a computer) may comprise a computer certificate and computer account credentials of the remote access client. To authenticate a user of the remote access client, the computer certificate and user's account credentials may be utilized. As one example, parameters of the security association used to generate the session identifier may comprise providerkey, the Main Mode Authentication Method, the Main Mode credential, the Extended Mode Authentication Method, and the Extended Mode credential. Though, it should be appreciated that any suitable parameters of the security association may be used, as embodiments of the invention are not limited in this respect.

One or more entity sessions may be aggregated into a connection based on an identity of a remote client computer for which security associations in the entity sessions were established. For example, an IP address (e.g., IPv6 address) of the remote client computer may be used to aggregate one or more entity sessions into a connection. Thus, security associations created for accessing resources on a corporate network from the same remote client computer may be aggregated into a single connection.

In some scenarios, the connection may include one entity session. For example, such entity session may comprise security associations created for a remote client computer (e.g., a "computer session") or for both a user of the remote client computer and the remote client computer (e.g., "a user/computer session") to connect to resources on the corporate network. Thus, the connection may encompass more than one entity sessions. Furthermore, if a second user logs on to the corporate network from the remote client that is utilized by a first user to access resource(s) on an enterprise network, another entity session may be identified that comprises security associations created based on an identity of the second user.

To generate a representation of a connection in accordance with some embodiments, security associations grouped into the connection may be used to determine what resources on the corporate network are accessed over the connection. The representation may thus be generated that indicates which entity is connected to which resources on the corporate network over the connection.

In some embodiments, the session identifier may be used to determine which resources on the corporate network are accessed over the connection. Accordingly, a corporate resource accessed by a user or a remote client computer using a security association may be indicated by parameters such as a session identifier, a remote IP address (i.e., an IP address of the remote client computer), an IP address of the resource, and a port and a protocol used for the access.

The described techniques of associating security associations with a connection as defined in accordance with some embodiments allow providing a single representation of the connection and presenting information on resources accessed over the connection. The information may be presented in any suitable manner. For example, it may be presented as a suitable visual representation on a user interface so that a network administrator may determine what resources are accessed by which user and/or remote client computer through the remote client computer. The information may be presented in a manner that allows modifying the way the information is presented.

The information on the connection and resources of the corporate network accessed over the connection may be used by the network administrator to track, monitor and control remote network access in any suitable manner. Furthermore, information obtained in conjunction with the connection and with accessing each resource over the connection, such as duration, number of bytes exchanged between a sender and a receiver, amount of bandwidth used and other information, may also be presented to the administrator. The administrator may use the information to monitor the connection in real time and generate reports for accounting and auditing tasks. For example, the administrator may be able to determine what type of data is currently obtained by a user from a resource. Amount of that data, speed of its transfer and any other associated information may be obtained as a resource is being accessed through a remote client computer.

FIG. 1 illustrates an exemplary environment 100 in which some embodiments may be implemented. In this example, a remote client computer 102, shown as a laptop computer, may connect to an enterprise network 104, which may be a corporate network, via a public network 103. Public network 103 may be, for example, the Internet. It should be appreciated that remote client computer 102 may be any suitable computing device, such as a SmartPhone, PDA, a tablet or any other type of a computing device, as embodiments of the invention are not limited in this respect.

Remote client 102 may connect to public network 103 in any suitable manner, such as by connecting to a LAN, a wireless access point or in any other way. In some embodiments, when remote client computer 102 detects that it is connected to the Internet, it may authenticate with enterprise network 104 using DirectAccess.

Access to resources 106 on enterprise network 104 may be controlled by a gateway server 108. Server 108 may be configured in any suitable manner. In embodiments where remote client computer 102 accesses enterprise network 104 using DirectAccess, server 108 may be a DirectAccess server. Server 108 may control access to resources 106 which may comprise one or more application servers, a SharePoint server, an email server and any other suitable resource. Thus, FIG. 1 shows by way of example that resources 106 may comprise servers 110 and 116 and computers 112 and 114. Though, it should be appreciated that any suitable resources on enterprise network 104 may be accessed by remote client computer 102, as embodiments of the invention are not limited in this respect.

As shown in FIG. 1, secure connections, such as IPsec connections 111, 113, 115, and 117, may be established between remote client computer 102 and resources 110, 112, 114 and 116, respectively. If connections 111, 113, 115, and 117 are established using DirectAccess, they may pass through server 108 which may be configured as DirectAccess server establishing one or more secure tunnels with remote client computer 102.

Figure 2:
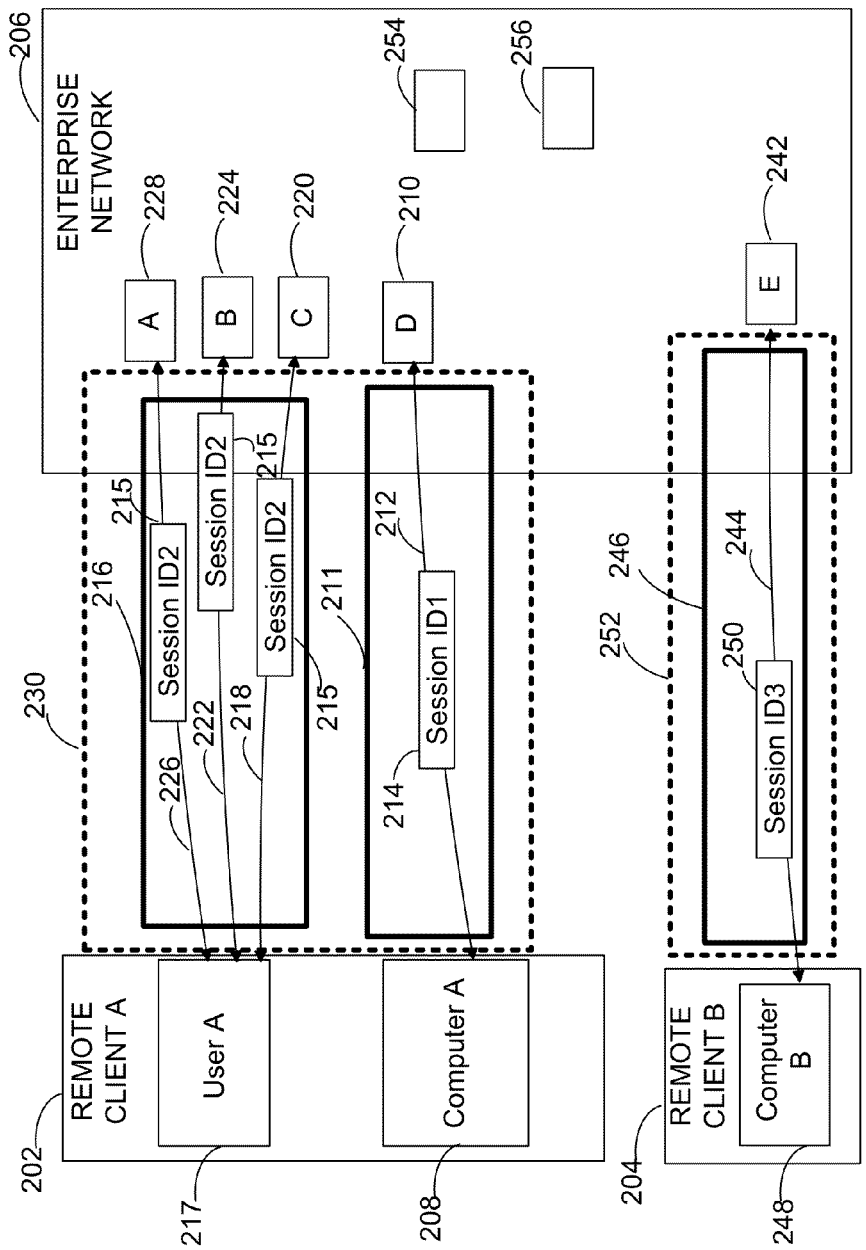
FIG. 2 is a schematic illustration of an exemplary environment in which a method of creating a representation for monitoring remote network access may be implemented, according to some embodiments of the invention.

FIG. 2 illustrates schematically the technique for associating security associations with an entity session and a connection, in accordance with some embodiments. In FIG. 2, exemplary remote client computers 202 and 204 may remotely connect to an enterprise network 206 (e.g., enterprise network 104 in FIG. 1). Each of remote client computers 202 and 204 may be a domain member of enterprise network 206. It should be appreciated that embodiments of the invention are not limited with respect to a number and type of remote client devices that may authenticate with the enterprise network to access resources on that network.

In this example, remote client computers 202 and 204 may connect to enterprise network 206 over DirectAccess. Though, it should be appreciated that any other remote network access technology based on IPsec may be utilized, as embodiments the invention are not limited in this respect.

Remote client computer 202 may connect to enterprise network 206 when the remote client detects that it is connected to the Internet. Remote client computer 202 may authenticate with enterprise network 206 before a user logs on to the network. Accordingly, an entity session 211 (e.g., a "computer session") may be established between an entity, shown in FIG. 2 by way of example as an entity 208 ("Computer A"), and enterprise network 206. A process of authenticating entity 208 with enterprise network 206 may involve providing by remote client computer 202 authentication information, such as a computer certificate and one or more suitable computer account credentials, to enterprise network 206. A gateway server (e.g., server 108 in FIG. 1) providing access to enterprise network 206 may receive the authentication information and determine whether entity 208 can be authenticated to access one or more resources on enterprise network 206.

Once authenticated, remote client computer 202 may connect to a resource "D" 210 on enterprise network 206, using a security association 212. Resource 210 may be a domain name server, a domain controller or any other suitable resource. A session identifier may be generated for security association 212 to associate security association 212 with entity session 211. In this example, a session identifier 214 ("Session ID1") may be generated. Session identifier 214 may be unique across one or more DirectAccess connections to enterprise network 206, or it may be unique over a certain period of time. In this example, no other security associations have been yet created, and session identifier 214 may be a first session identifier to be associated with entity session 211 created for entity 208.

Accordingly, one or more security associations created for a remote client computer, prior to user's logging on the enterprise network, may be aggregated into an entity session. Another entity session may be formed from security associations created for a different entity, such as a user of the remote client computer.

FIG. 2 illustrates that, after remote client computer 202 is authenticated, a user (e.g., "User A") of remote client computer 202 may log on to enterprise network 206 through remote client computer 202. User A's authentication with enterprise network 206 may depend on both user and machine authentication information, and entity session 216 may therefore be referred to as a "user/machine" session. For example, a computer certificate and user account credentials may be utilized. The user A is shown in FIG. 2 by way of example as an entity 217 that may connect to one or more resources on enterprise network 206 via another entity session 216 with enterprise network 206. FIG. 2 shows that a security association 218 may be established for user A to access resource "C" 220, security association 222 may be established for user A to access resource "B" 224 and security association 226 may be established for user A to access resource "A" 228.

In some embodiments, session identifier 215 ("Session ID2") may be generated for each of security associations 218, 222 and 226 so that these security associations have an identical identifier, as illustrated in FIG. 2. The identical session identifiers 215 may be used to associate security associations 218, 222 and 226 with entity session 216. A session identifier generated in accordance with some embodiments may be unique for each session. Accordingly, as shown in FIG. 2, session identifier 215 generated for each security association within entity session 216 is different from session identifier 214 generated for each security association within entity session 211.

In some embodiments, entity sessions created for each entity associated with the same remote access computer may be aggregated into a connection. The connection may be a remote access connection established between a remote access client and an enterprise network using a suitable remote access technology, such as DirectAccess. The connection as defined herein may comprise one or more IPsec connections between one or more entities accessing resources on the enterprise network through the remote access client.

Accordingly, FIG. 2 illustrates that entity session 211 and entity session 216 may be associated with a connection 230, based on an identity (e.g., an IP address) of remote client computer 202. In this example, entity session 211 comprises security association 211, and entity session 216 comprises security associations 218, 222 and 226. Security associations 212, 218, 222 and 226 may thus be associated with connection 230. Connection 230 may comprise security associations generated for one or more entities connecting to resources on an enterprise network through a single remote client.

In some embodiments, session identifiers 214 and 215 may be used to indicate which resources on the enterprise network are accessed over connection 230. An exemplary implementation of such indication is shown in more detail with reference to FIG. 3.

It should be appreciated that even though connection 230 between remote client computer 202 and enterprise network 206 is shown in FIG. 2 as including two entity sessions 211 and 216 (i.e., for user A operating computer A and for computer A), any suitable number of entity sessions may be associated with connection 230, in accordance with some embodiments. For example, if a second user logs on to enterprise network 206 through remote client 202, another entity session may be formed within connection 230, based on authentication information on remote client computer 202 and the second user.

More than one remote client computers may connect to an enterprise network using a suitable remote network access technology. In embodiments in which DirectAccess technology is utilized, a remote client computer may connect to an enterprise network once the remote client computer is connected to the Internet. A user may or may not subsequently log on to the corporate network through that computer.

Accordingly, FIG. 2 shows that a remote client computer 204 may connect to a resource ("E") 242 on enterprise network 206, using a security association 244. Resource 242 may be a domain name server, a domain controller or any other suitable server.

In this example, a single entity session (e.g., a "computer session") 246 may be established for an entity 248 ("Computer B") that accesses enterprise network 206 through remote client computer 204, based on information associated with remote client computer 204, such as authentication information and any other suitable information. Such a single "computer session" may be established in scenarios where user participation may not be required. For example, a remote client computer may automatically obtain software updates (e.g., antivirus or other) from a suitable source on the enterprise network. Moreover, in some scenarios, a client computer inside the enterprise network may connect to a remote client computer to "manage out" the remote client by performing management operations with respect to the remote client.

A session identifier ("Session ID3") 250 may be generated for security association 244. Session identifier 250 may be associated with entity session 246 that may be determined to belong to a connection 252 between remote client computer 204 and enterprise network 206.

FIG. 2 illustrates schematically that enterprise network 206 may include any other suitable resources shown by way of example as resources 254 and 256. It should be appreciated that, even though remote client computers 202 and 204 are shown in FIG. 2 to connect to different resources on enterprise network 206, one or more resources on enterprise network 206 may be accessed by both remote client computers 202 and 204 and other suitable remote clients, provided that these remote clients are authorized to access these resource(s).

Figure 3:
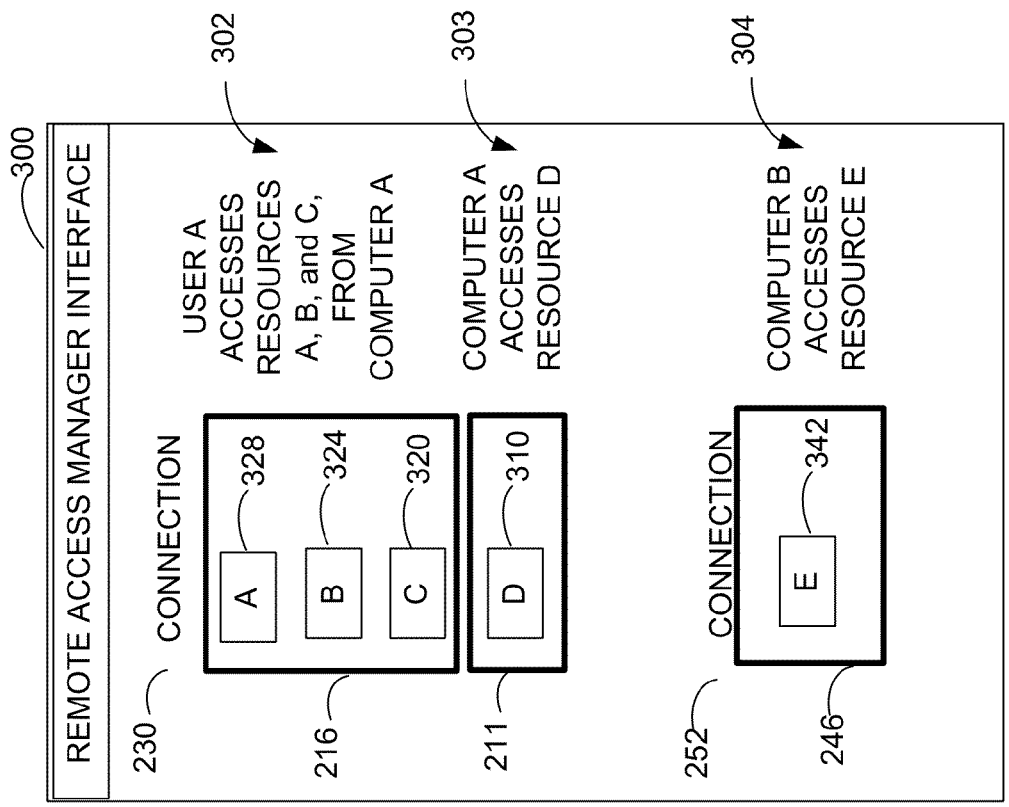
FIG. 3 is a sketch of an illustrative embodiment of an exemplary user interface displaying a representation for monitoring remote network access, according to some embodiments of the invention.

The described techniques allow displaying a representation of a connection as a single view of resources accessed over that connection, based on aggregating security associations generated as part of the connection. FIG. 3 illustrates an exemplary implementation of a user interface, such as a remote access manager interface 300, presenting information obtained as described in conjunction with FIG. 2. Remote access manager interface 300 may be presented on a suitable computing device. The computing device may be utilized by a network administrator to monitor remote access to a corporate network. The computing device may be located inside the corporate network.

In some scenarios, the network administrator may also access the corporate network for monitoring and management purposes remotely, using DirectAccess or other suitable network access technology. It should be appreciated that embodiments of the invention are not limited with respect to a computing device that may be used by the network administrator to obtain and utilize information on remote network access.

As shown in FIG. 3, remote access manager interface 300 may display information on resources that are accessed over connections 230 and 252 identified in accordance with some embodiments. Thus, FIG. 3 illustrates that connection 230 may be used to access resources A 228, B 224, C 220 and D 210, displayed in FIG. 3 using respective visual representations 338, 324, 320 and 310, through remote client computer 202. It should be appreciated that any suitable visual representations 338, 324, 320 and 310 may be utilized to provide information about resources A 228, B 224, C 220 and D 210 accessed over connection 230, as embodiments of the invention are not limited in this respect.

FIG. 3 may also show entity session 216 formed from security associations used to connect to resources A 228, B 224, and C 220 and entity session 211 formed from the security association used to connect to resource D 210. Entity sessions 211 and 216 comprise security associations established to access the enterprise network through the same remote client computer 202.

More than one remote client computer may be used to access resources on an enterprise network via a remote access connection. Thus, FIG. 3 also shows connection 252 that may comprise entity session 246 for an entity that connects to resource E 242, shown as a schematic representation 342, through a different remote access client 204. Accordingly, each connection between a remote client computer and a corporate network may be represented as a single view including corporate resources accessed over that connection.

FIG. 3 also illustrates that, additionally or alternatively, information about the resources accessed over the connection may be presented in a textual format. Thus, remote access manager interface 300 may, in conjunction with connection 230, display a message 302 indicating that "user A accesses resources A, B, and C from computer A." Similarly, remote access manager interface 300 may also display, also in conjunction with connection 230, a message 303 indicating that "computer A accesses resource D." Another message 304 may be displayed on remote access manager interface 300 in conjunction with connection 252, indicating that "computer B accesses resource E."

Figure 6:
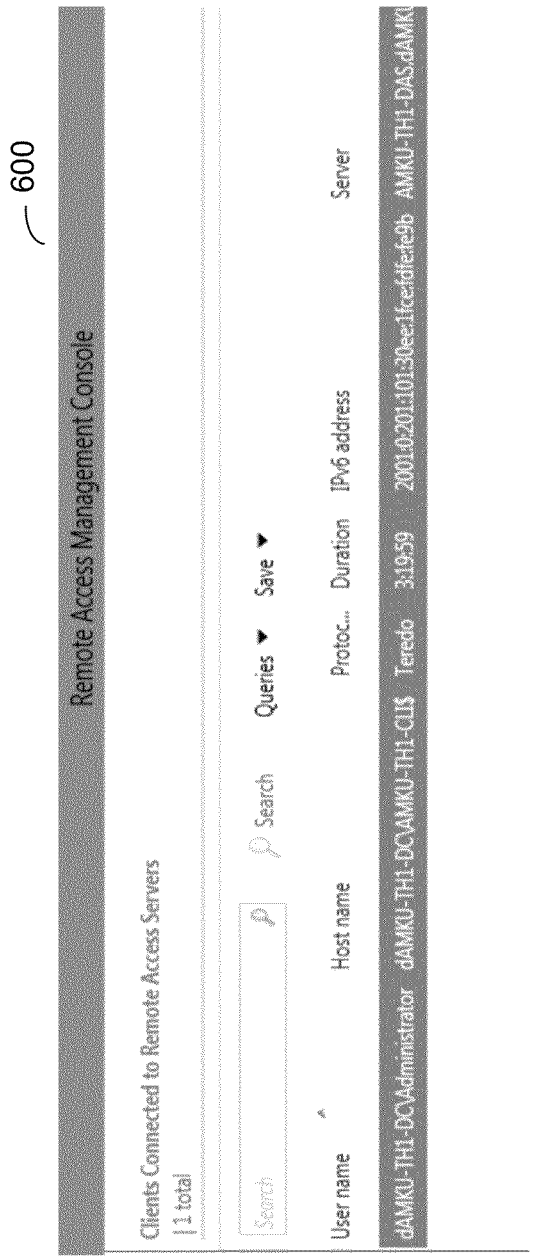
FIG. 6 is a snapshot of a remote access user interface, according to one embodiment of the invention.

It should be appreciated that resources accessed over the connection established using DirectAccess or other suitable technology may be represented using any suitable textual, graphical or other format. Remote access manager interface 300 is an example of how the corporate network resources may be visualized so that a network administrator may monitor and manage remote access to the resources. Any other representation may be substituted. Another exemplary implementation of user interface 600 displaying information about the resources accessed over the connection established using DirectAccess is shown in FIG. 6.

Figure 4:
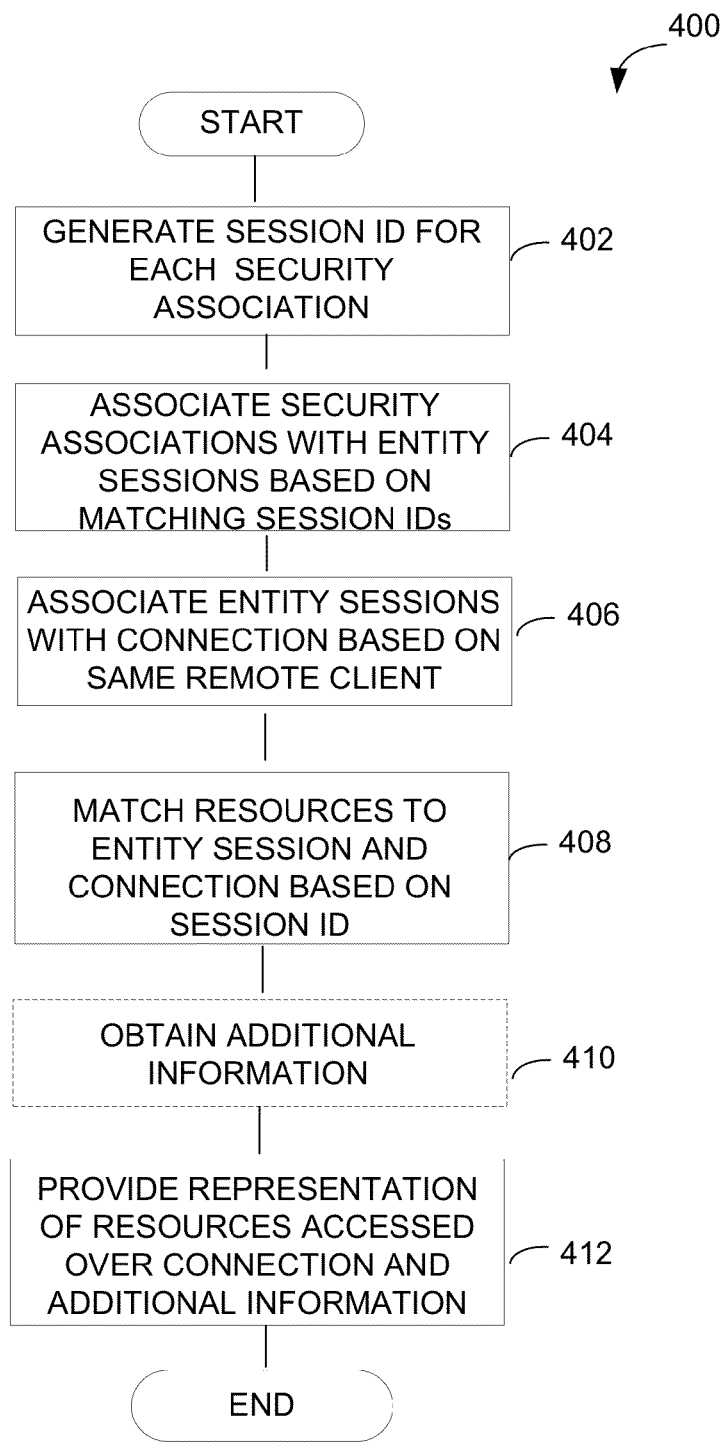
FIG. 4 is a flowchart of a method of creating a representation of a connection between a remote client computer and an enterprise network for monitoring remote network access, according to some embodiments of the invention.

FIG. 4 illustrates a process 400 of creating a representation of a connection between a remote client computer and an enterprise network, such as a corporate network, for monitoring remote network access, according to some embodiments of the invention. Process 400 may be implemented in any suitable computing environment.

Process 400 may start at any suitable time. For example, process 400 may start when a remote client computer that may be a member of a corporate network authenticates with the corporate network and accesses one or more resources on the network.

At block 402, a session identifier may be generated for each security association so that security associations may be associated with an entity session based on that identifier, in accordance with some embodiments of the invention. The session identifier for a security association may be generated using any suitable parameters of the security association. For example, the identifier may be generated based on credentials (e.g., user and/or computer account credentials) of the entity for which the security association was established so that identical identifiers are generated for security associations negotiated for the same entity. As one example, parameters of the security association used to generate the identifier may comprise providerkey, the Main Mode Authentication Method, the Main Mode credential, the Extended Mode Authentication Method, and the Extended Mode credential. Though, the session identifier may be generated in any other suitable manner.

Next, each security association may be associated with an entity session, if the session identifier generated for the security association matches session identifiers for security associations in the entity session, at block 404. Different entity sessions may include security associations having a different session identifier, with the same session identifier being generated for each security association in the entity session. For example, one entity session may comprise security associations, each having a first session identifier, established when a remote client computer accesses resources on a corporate network and a second entity session may comprise security associations, each having a second session identifier, established for a user that utilizes the remote client computer to log on to the corporate network and access resources on the corporate network. Processing at blocks 402 and 404 is described in more detail in conjunction with FIG. 5.

Referring back to FIG. 4, one or more entity sessions may be associated with a connection at block 406, based on an identity of the remote client computer for which security associations in the entity sessions are created to access one or more resources on the corporate network. The identity of the remote client computer may be, for example, an IP address of the remote client or any other information that uniquely identifies the remote client computer.

Next, at block 408, resources accessed over the connection may be matched to the entity session and to the connection, based on the session identifier generated for the security associations associated with the entity session. Matching resources on the corporate network to the connection may allow generating a representation of the connection indicating what resources are accessed by what entity over the connection. An example of such representation is illustrated in FIG. 3.

In some embodiments, additional information may be obtained on the connection and resources accessed over the connection, as shown by an optional block 410 in FIG. 4. This information may comprise different values, such as duration of the connection, number of bytes exchanged between a sender and a receiver, amount of bandwidth used, an activity status of the connection and any other information. Additionally or alternatively, any suitable statistical processing of the values may be performed, which may be used to generate reports on remote network and for various auditing purposes.

Information on a remote client machine and/or its user that access resources over the connection, as well as any other information obtained at block 410, may be provided to a network administrator in a suitable manner, at block 412. For example, the information may be displayed on a user interface, as shown by way of example in FIG. 3. Additional exemplary implementations of presenting the information are shown on a user interface 700 in FIG. 7 and a user interface 800 in FIG. 8. Accordingly, techniques described herein may provide a representation of a remote network access connection that may allow a network administrator to monitor and manage the connection in an improved manner, even though multiple security association may be generated over the connection.

Figure 5:
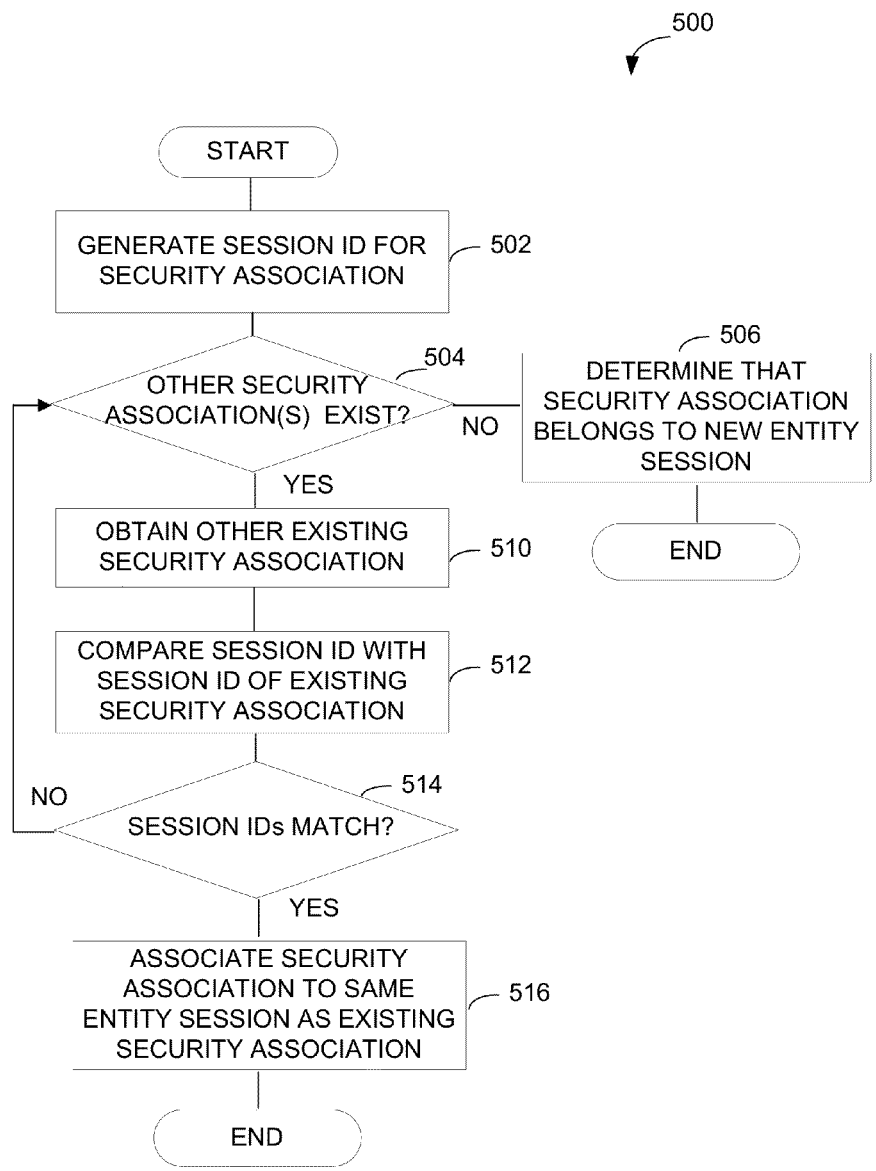
FIG. 5 is a flowchart of a method of associating a security association with an entity session, according to some embodiments of the invention.

FIG. 4 describes generally that a security association created for a resource accessed by a remote client computer may be associated with an entity session, based on a session identifier generated for the security association. FIG. 5 illustrates in more detail a process 500 of associating a security association with an entity session, according to some embodiments of the invention.

Process 500 may start at any suitable time. For example, process 500 may start when a remote client computer (e.g., remote client 102 in FIG. 1) authenticates with a corporate network using a suitable remote network access technology and connects to a resource on the corporate network. In some embodiments, the remote network access technology may be DirectAccess. The remote client computer may authenticate with the corporate network if the computer is a member of the network and can provide required authentication information, such as a suitable certificate and/or credentials, to obtain access to the network.

A security association may be generated for the remote client computer to connect to a resource on the corporate network. For example, if an IPsec connection is established between the remote client computer and the resource, the security association may be created for this IPsec connection in accordance with IPsec, using mechanisms as known in the art or developed in the future. The security association may include any suitable information that may be required for the authentication between the remote client computer and the resource and encryption of data to be exchanged between them. For example, if the remote client computer, such as a laptop computer, accesses an application server, an access policy specified for the application server, an IP address of the remote client computer and any other information may be utilized to create the security association.

Referring back to FIG. 5, a session identifier may be generated for the security association, at block 502. The session identifier may be generated so that identical session identifier may be generated for security associations associated with the same entity session, in accordance with some embodiments of the invention.

Process 500 may then branch at block 504 depending on whether one or more other security associations exist for the remote client computer to compare their session identifiers with the session identifier generated at block 502. The security associations may be stored, for example, in a database of security associations, and the database may be queried to determine whether any security associations have been generated for the remote client computer that has connected to the corporate network. Though, it should be appreciated the existence of other security associations may be determined in any other suitable manner.

Other security associations may have been created and session identifiers have been generated for them if one or more resources have been previously accessed from the remote client computer over DirectAccess. If it is determined that no other security associations exist, process 500 may proceed to block 506 where it may be determined that the security association belongs to a new entity session. An example of such security association may be, for example, security association 212 generated when remote client computer 202 first accesses resources 210 on enterprise network 206 (FIG. 2. Process 500 may then end. Though, it should be appreciated that process 500 may execute continuously, as the remote client connected to the corporate network accesses resources on the network and/or is operated by a user to access resources on the network.

Alternatively, if it is determined that one or more other security associations have been previously negotiated between the remote client computer and one or more resources on the corporate network, process 500 may continue to block 510 where one of such existing security associations may be obtained. Next, at block 512, a session identifier generated for the other security association may be compared to the session identifier generated at block 502.

Next, process 500 may branch at block 514 based on whether the session identifiers match. Accordingly, if it is determined that the session identifiers are identical, the security association assigned the session identifier generated at block 502 may be associated, at block 516, with the same entity session as the existing security association obtained at block 510. An example of such security associations may be, for example, security associations 218 and 222 associated with the same entity session 216 (FIG. 2). Process 500 may then end. Though, it should be appreciated that, as discussed above, process 500 may execute continuously, as the remote client computer connected to the corporate network is used to access resources on the network and security associations are created IPsec connections between the remote client computer and one or more resources on the corporate network.

Alternatively, if it is determined the session identifiers are not identical, process 500 may return to block 504 where it may again determine whether any other security associations exist to compare their session identifiers to the session identifier generated at block 502. Accordingly, process 500 may iterate until the security association generated assigned the session identifier generated at block 502 is associated with an existing entity session or until it is determined that the security association is a first security association in a new entity session.

In some embodiments, after the security association is assigned to an entity session, the entity session may be assigned to a remote access connection and information about resources accessed over the remote access connection may be provided in a suitable form, such as displayed on a user interface.

Figure 9:
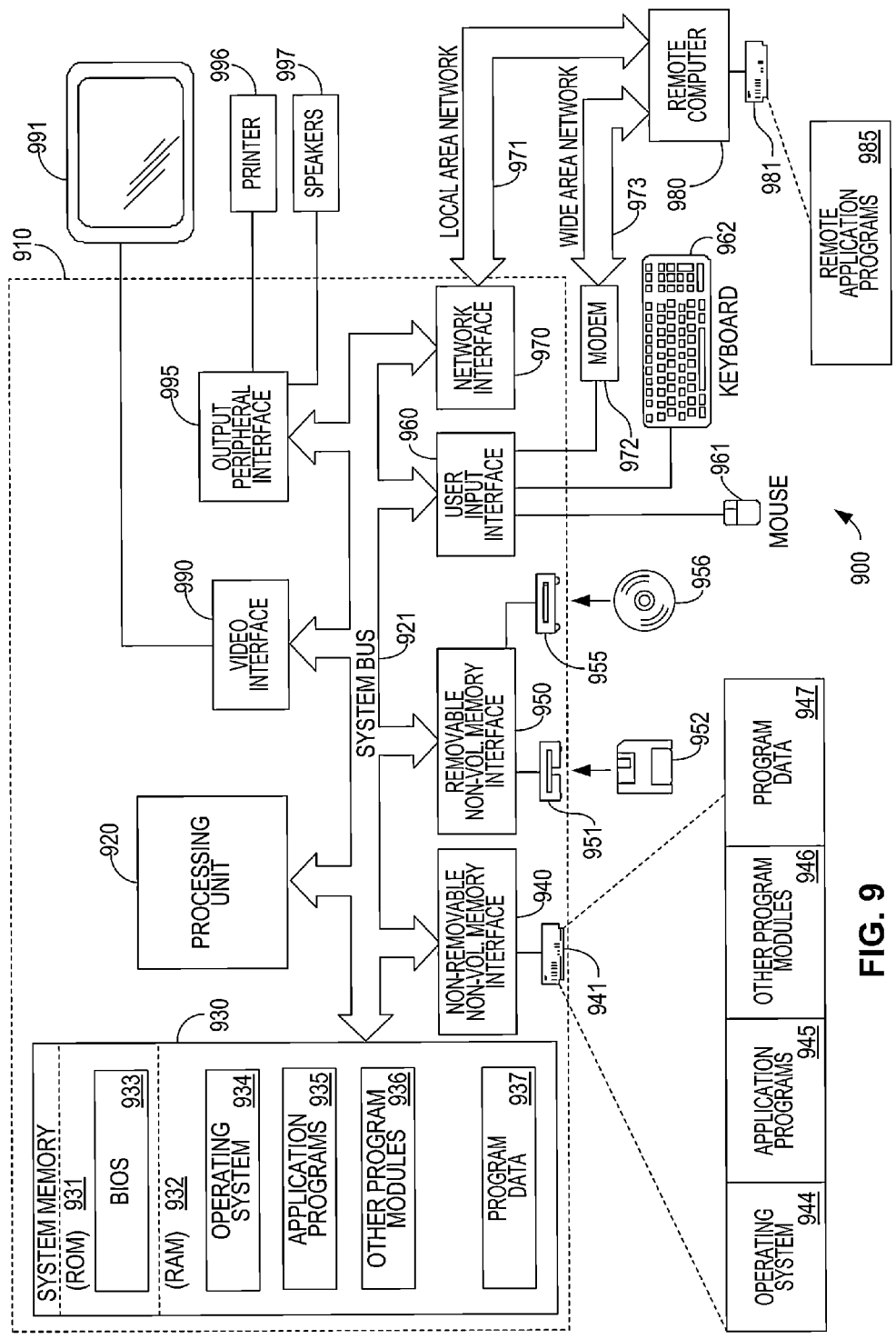
FIG. 9 is a functional block diagram of an illustrative computing device in which embodiments of the invention may be implemented.

Any suitable computing device may be configured to generate a presentation of a connection that comprises security associations created for resources on a corporate network that are accessed through the remote client computer connected to the network, in accordance with some embodiments. FIG. 9 illustrates an example of a suitable computing system environment 900 on which some embodiments of the invention may be implemented. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment 900.

Some embodiments of the invention are operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 9, an exemplary system for implementing the invention includes a general purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 940 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable storage medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a computing device comprising at least one processor for monitoring remote access by entities to resources through security associations in an enterprise network, the method comprising, with the at least one processor:
    for each security association created between one of the entities and one of the resources, generating a session identifier;
    associating security associations having matching session, identifiers with unique entity sessions, wherein each security association associated with a unique entity session has a same session identifier;
    associating entity sessions with connections, based on at least identities of remote client computers related to the security associations, such that each entity session associated with a connection is related to a same remote client computer, such that each connection represents security associations created for resources on the enterprise network accessed through the same remote client computer; and
    providing a representation of each connection, the representation indicating one or more of the resources accessed by one or more of the entities through the same remote client computer over the connection.

2. The method of claim 1, further comprising:
    generating the session identifier for a security association based on at least one parameter of the security association.

3. The method of claim 2, wherein the entities include at least one selected from the group consisting of a user of the remote client computer that has a user account with the enterprise network and the remote client computer that has a computer account with the enterprise network.

4. The method of claim 1, wherein:
    at least one of the security associations is generated for an IPsec session between the remote client computer and the resource.

5. The method of claim 1, wherein:
    the connection comprises a remote network access connection; and
    the remote client computer is connected to the corporate network using DirectAccess.

6. The method of claim 1, wherein providing the representation on the connection comprises:
    determining, based on the first identifier, that the resource is accessed over the connection.

7. The method of claim 1, wherein:
    providing the representation comprises displaying the representation on a user interface.

8. The method of claim 7, further comprising:
    enabling a user to provide input with respect to the representation.

9. The method of claim 1, further comprising:
    providing information obtained in conjunction with the connection, the information comprising at least one parameter of the connection.

10. The method of claim 9, wherein:
    the information further comprises resource usage information on the connection.

11. The method of claim 1, wherein:
    an identity of the remote client computer comprises an IP address of the remote client computer.

12. The method of claim 1, wherein associating entity sessions with connections further is based on user identifier.

13. A computer for monitoring remote access by entities to resources through security associations in an enterprise network, the computer comprising at least one processor, the computer adapted to, with the at least one processor:
    for each security association, generate a session identifier;
    associate security associations having matching session identifiers, with unique entity sessions, wherein each security association associated with one of the unique entity sessions has a same session identifier;
    associate entity sessions with connections, based on at least identities of remote client computers related to the security associations, such that each entity session associated with a connection is related to a same remote client computer, such that each connection represents security associations created for resources on the enterprise network accessed through the same remote client computer; and
    provide a representation of each connection, the representation indicating one or more of the resources accessed by one or more of the entities through the same remote client computer over the connection.

14. The computer of claim 13, wherein associating entity sessions with connections further is based on user identifier.

15. The computer of claim 13, wherein:
    the remote client computer is connected to the enterprise network using DirectAccess.

16. The computer of claim 13, further adapted to:
    provide the representation by displaying the representation on a user interface.

17. At least one computer-readable storage medium, being at least one of memory and nonvolatile storage, comprising computer-executable instructions that, when executed by at least one processor, implement a method of monitoring remote access by entities to resources through security associations in an enterprise network, the method comprising:

for each security associated created between one of the entities and one of the resources, generating a session identifier;

associating security associations having matching session identifiers with unique entity sessions, wherein each security association associated with a unique entity session has a same session identifier;

associating entity sessions with connections, based on at least identities of remote client computers related to the security associations, such that each entity session associated with a connection is related to a same remote client computer, such that each connection represents security associations created for resources on the enterprise network accessed through the same remote client computer connected; and providing information on each connection, the information indicating one or more of the resources accessed by one or more of the entities through the same remote client computer over the connection.

18. The at least one computer-readable storage medium of claim 17, wherein:

the remote client computer is connected to the enterprise network using DirectAccess.

19. The at least one computer-readable storage medium of claim 17, wherein:

the resource comprises at least one application server.

20. The at least one computer-readable storage medium of claim 17, wherein associating entity sessions with connections further is based on user identifier.

* * * * *